UNITED STATES PATENT OFFICE.

EMIL FISCHER, OF BERLIN, GERMANY, ASSIGNOR TO C. F. BOEHRINGER & SOEHNE, OF WALDHOF, GERMANY.

TRIMETHYLBENZYL-URIC ACID AND PROCESS OF MAKING SAME.

SPECIFICATION forming part of Letters Patent No. 588,412, dated August 17, 1897.

Application filed April 17, 1897. Serial No. 632,679. (No specimens.)

*To all whom it may concern:*

Be it known that I, EMIL FISCHER, a citizen of the German Empire, residing at Berlin, in the German Empire, have invented certain new and useful Improvements in Trimethylbenzyl-Uric Acid and Process of Making Same; and I do hereby declare the following to be a full, clear, and exact description of the invention, such as will enable others skilled in the art to which it appertains to make and use the same.

The present invention relates to the art of obtaining the substitution products of uric acid, and more particularly to the production of a new body first obtained and discovered by me, and which I term "trimethylbenzyl-uric acid."

In my application, Serial No. 610,126, filed October 26, 1896, I have described a process which, broadly considered, consists in treating uric acid with a haloid ether, such as iodid of methyl or ethyl or chlorid of benzyl, together with an alkali, preferably using the wet way. In that application the present invention was described as one of the examples of carrying out that process. The present application is designed to cover this process and the product thereof specifically.

This invention therefore consists in treating a trialkyl-uric acid, together with an alkali, with a haloid ether, and in such further features, steps, and methods as will be described hereinafter and pointed out in the claims.

In illustration of my invention I will describe two examples, showing how the same may be carried out in practice.

1. *Conversion of β-trimethyl-uric acid into 1.2.4 trimethyl 3 benzyl-uric acid.*—One part of 1.2.4 trimethyl-uric acid or β-trimethyl-uric acid is dissolved in 4.7 parts of normal potash-lye and as much water and then digested for one hour with 0.7 parts of benzyl chlorid at substantially 100° centigrade.

The process takes place according to the following equation:

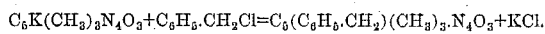

The new product is separated in the form of crystals already during the course of the process. It is first washed with dilute ammonia and the residue recrystallized from hot alcohol. The yield is very good.

1.2.4 trimethyl 3 benzyl-uric acid, whose structural formula is—

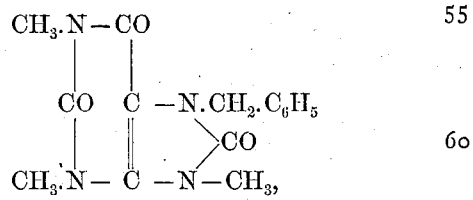

forms large coarse crystals which melt at from 171° to 173° centigrade and are insoluble in alkalies.

2. *Conversion of 1.4 dimethyl 3 benzyl-uric acid into 1.2.4 trimethyl 3 benzyl-uric acid.*—I dissolve one part of 1.4 dimethyl 3 benzyl-uric acid in seven parts of one-half normal potash-lye, add 0.7 parts of methyl iodid, and heat in a closed vessel to 100° centigrade, and maintain the same at this temperature for one hour and frequently shake the same. The reaction taking place is expressed in the following equation:

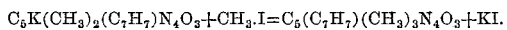

The proportions above given are to be understood as expressed in weight.

It is to be observed that in the above process other alkalies may be used in lieu of the potash-lye, and the term "alkali" as used in the specification and claims should be broad enough to include not only the hydrates of alkali metals, including ammonium, but also the carbonates and other salts of the alkali metals, with weak acids, organic or inorganic, so long as said salts have preponderating alkaline properties. Instead of the methyl iodid and benzyl chlorid employed other methyl or benzyl halogen compounds may be used.

I do not, therefore, desire to be limited to the features described in illustration of my invention; but

What I claim, and desire to secure by Letters Patent, is—

1. The process which consists in acting upon a trialkyl-uric acid, together with an akali, with a haloid ether.

2. The process which consists in acting upon a trialkyl-uric acid, together with an alkali, with a benzyl halogen compound.

3. The process which consists in treating trimethyl-uric acid together with an alkali and water, with benzyl chlorid.

4. The process which consists in dissolving trimethyl-uric acid in potash-lye and water, then heating the same with benzyl chlorid.

5. As a new chemical compound, trimethyl-benzyl-uric acid having the formula above given, which melts at about from 171° to 173° centigrade, and crystallizes from alcohol in large coarse crystals insoluble in alkalies.

In testimony whereof I affix my signature in presence of two witnesses.

EMIL FISCHER.

Witnesses:
HENRY HASPER,
W. HAUPT.